TWO-WIRE SWITCHING SYSTEM FOR FOUR-WIRE CIRCUITS

Filed June 4, 1962 7 Sheets-Sheet 1

INVENTOR
R.U. JUDY
R.E. ARSENEAU
BY [signature]
ATTORNEY

United States Patent Office
3,230,315
Patented Jan. 18, 1966

3,230,315

TWO-WIRE SWITCHING SYSTEM FOR FOUR-WIRE CIRCUITS

Robert V. Judy, Chicago, and Roger E. Arseneau, Elkgrove Village, Ill., assignors to International Telephone and Telegraph Corporation
Filed June 4, 1962, Ser. No. 199,696
16 Claims. (Cl. 179—27)

This invention relates to switching systems generally and more particularly to two-wire switching systems for four-wire circuits.

Voice frequency telephone repeaters are usually distributed along long distance lines to amplify speech signals and thus compensate for line loss. Since these lines provide two-way communication channels, the repeaters must amplify in two directions. Except for the simplest relatively short lines, this means that two oppositely facing amplifiers must be provided. Conventionally this requires at least a section of a four-wire transmission line. Two of these four-wires form a one-way voice channel transmitting in one direction. The other two of these wires form a one-way voice channel transmitting in an opposite direction.

While four-wire lines and associated repeaters are widely used with good results, they have certain disadvantages because two-wire and four-wire lines must be interconnected. First, each two-to-four wire converter (the term also includes a four-to-two wire converter) conventionally requires a hybrid network. Each hybrid network causes a loss of signal strength because approximately fifty percent of the signal is absorbed in a balancing network. Second, hybrid networks are notorious sources of trouble because the line impedances vary greatly, and the signal does not divide into two exactly equal parts applied to line and balancing networks. Thus, small portions of the amplified signal current feedback are reamplified, and the four-wire circuit breaks into oscillation or singing. On extremely long lines, singing problems become acute. Therefore, some systems do not provide any two-wire transmission, but provide a full four-wire transmission from subscriber set to subscriber set.

Full four-wire systems are very expensive because most low cost, mass produced, commercial, switching equipment accommodates two-wires only. Thus, the four-wire equipment is generally high cost, low production volume, specially built equipment. For example, the simple plug-and-jack conventionally used on a manual switchboard accommodates two talking wires. The alternative is either to use expensive specially built four-wire plugs and jacks or to use a cumbersome combination of two two-wire plugs and jacks per circuit.

Accordingly, an object of this invention is to provide new and improved two-wire switching systems for four-wire circuits. In this connection an object is to provide such systems without requiring conventional hybrid circuits, and yet to allow for the use of conventional two-wire switching components. Here an object is to avoid hybrid losses in signal strength. Moreover, an object is to accomplish these ends without allowing any circuit oscillation or singing. Quite the contrary, an object is to positively control all circuit responses which might otherwise tend to cause singing.

Another object of the invention is to reduce the cost of telephone systems generally. Here an object is to provide modules of general utility which not only afford two-to-four wire switching, but also afford conference call switching. A particular object is to provide a conference call circuit which will remain stable when twenty-five lines are connected together.

In accordance with one aspect of this invention, a module of general utility includes a pair of class A amplifiers connected to provide four-wire, two-way amplification. A circuit, comprising a crossover amplifier, interconnects these two class A amplifiers and controls the amplifier volume during conditions which might otherwise cause singing. A two-wire link provides a mixing circuit which isolates the amplifiers from electrical effects which might also cause singing. The two-wires of this link form switching points which allow the four-wire circuits connected to the amplifiers to be switched by two-wire switching equipment. Since more than twenty five (depending upon the desired quality of signal) four-wire circuits may be connected to a single link, the module is also well adapted for conference call switching.

The above mentioned and other features of this invention and the manner of obtaining them will become more apparent, and the invention itself will be best understood by reference to the following description of an embodiment of the invention taken in conjunction with the accompanying drawings in which.

*General description*

Figure 1:
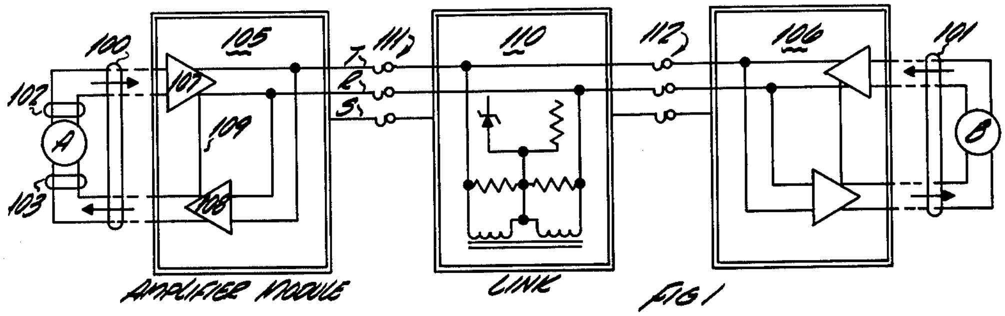
FIGURE 1 is a simplified block diagram showing how two-wire automatic telephone switches having conventional tip, ring, and sleeve brushes may switch four-wire circuits.

FIGURE 1 shows a greatly simplified four-wire telephone system utilizing two-wire switches and exemplifying the principles of the invention. In this figure, two telephone stations (A, B) are connected to four wire lines 100, 101. The stations A, B could be any suitable devices such as: subscriber stations, switchboards, carrier terminals, or the like. A first two (102) of each four-wires provide a transmit channel, and a second two (103) provide a receive channel.

In combination with the four-wire system are a number of amplifier modules 105, 106. Since they are identical, module 105 is described here, by way of example. Each module includes a pair of amplifiers 107, 108 arranged to conduct in opposite directions. The input of a first amplifier 107 is connected to the transmit channel 102, and the output of the other amplifier 108 is connected to the receive channel 103.

An automatic volume control is indicated by the conductor 109 which interconnects the amplifiers 107, 108. During times when station A transmits over channel 102, amplifier 107 feeds a signal over conductor 109 to cancel or reduce the volume of amplifier 108. This way amplified signals are not fed back from one amplifier and reamplified in the other amplifier to cause singing in the four-wire circuit 100.

Figure 11:
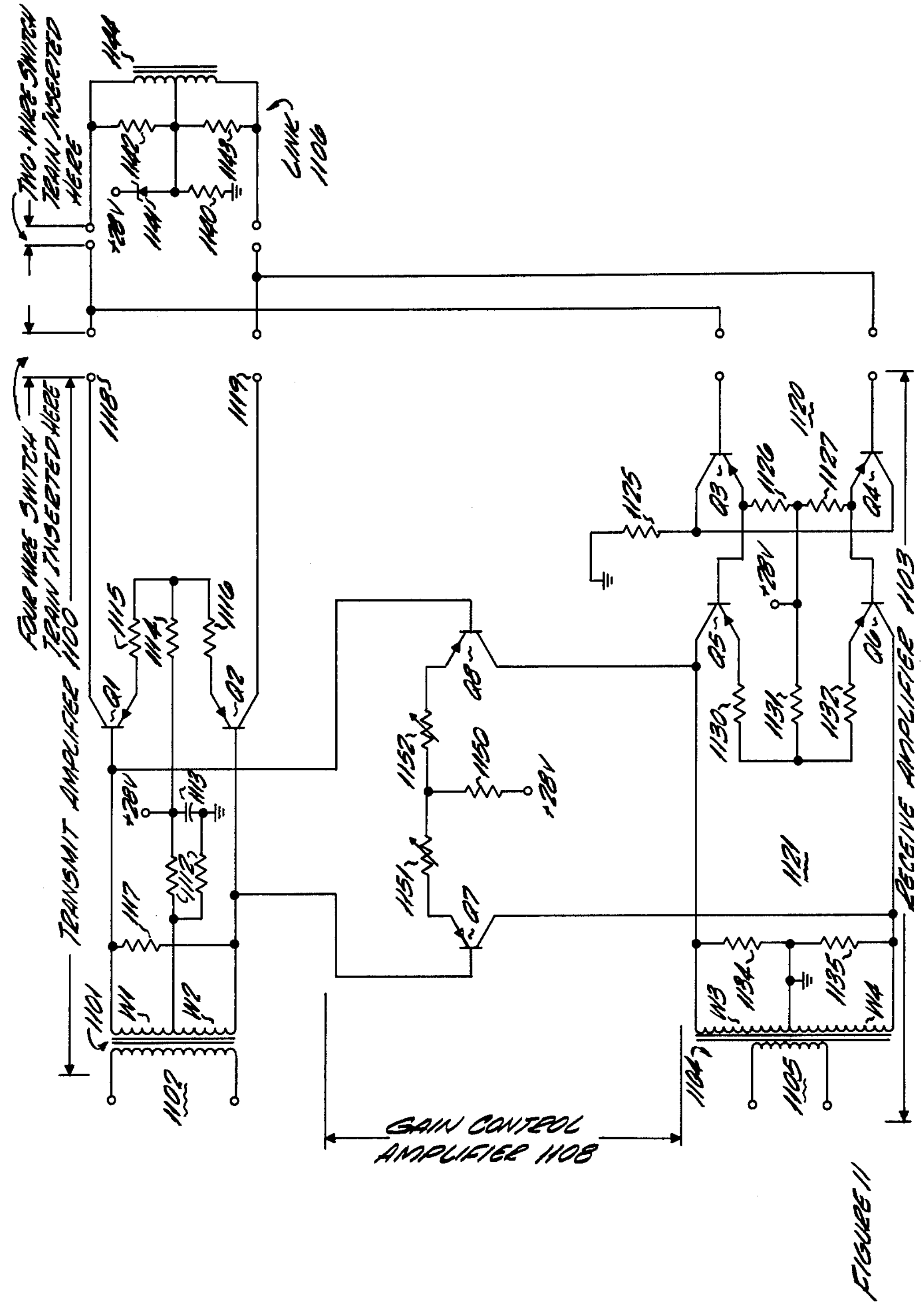
FIGURE 11 is a schematic circuit diagram which shows the details of a four-wire amplifier module and a two-wire link.

A link 110 interconnects the ouput of amplifier 107 and the input of amplifier 108 to provide for mixing the signals appearing in the various transmit and receive channels. The link 110 also isolates the amplifiers from disruptive electrical effects which might otherwise cause singing. Since the amplifiers and link circuitry are shown in FIG. 11, a detailed description of these components will be reserved.

Two-wire switching means 111, 112 interconnect the amplifier modules 105, 106 and the link 110. This switching means may take any suitable form. For example, the drawing may indicate the tip, ring, and sleeve brushes T, R, S of a conventional step-by-step switch or crossbar switch. Those skilled in the art will readily perceive other two-wire switching devices which may be used also. Thus, it should be apparent that low cost, mass produced, commercially available two-wire switching equipment may be used to switch four-wire lines.

Figure 2:
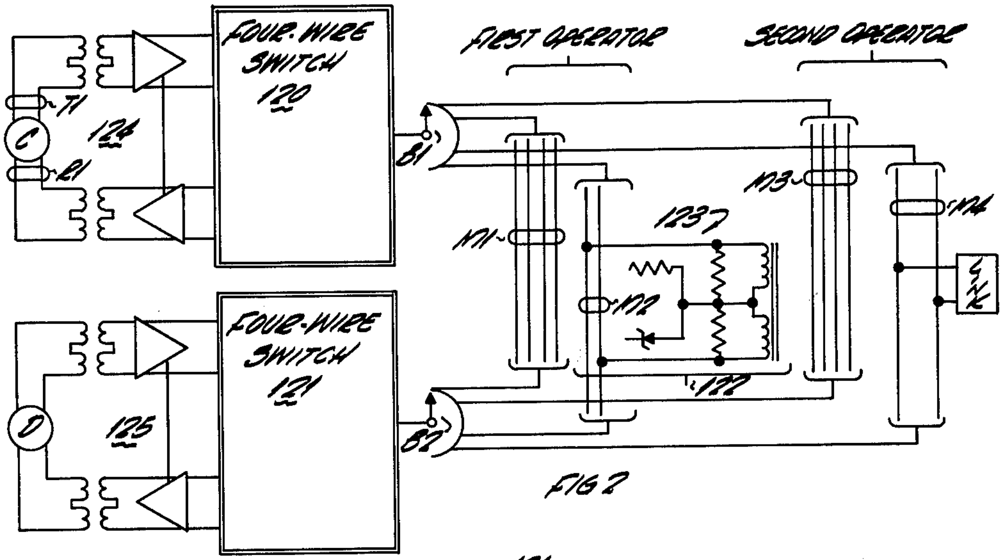
FIGURE 2 is a block diagram showing how the lines of a four-wire system may be connected via four-wire switches during a conference call.

A four-wire switching telephone system, including a conference call circuit constructed in accordance with this invention, is shown in FIG. 2. This system includes a number of subscriber lines (represented by lines C, D) connected to individually associated four-wire switching modules 120, 121. These modules are described in a co-pending application entitled "Mobile Cordless Switchboard," S.N. 127,196, filed July 27, 1961, by Miller and Duncan, assignors to the assignee of this invention. Each switching module forms a four-wire device for extending subscriber lines C, D to a conference call circuit 122. The conference call circuit includes a pair of common busses (multiple M2) and a link 123 fed by amplifying modules 124, 125. The two-wire side of each amplifying module is coupled to a common link circuit 123 where all signal currents are mixed. The amplifying modules 124, 125 and link circuit 123 are identical to corresponding circuits of FIG. 1, described above.

Figure 3:
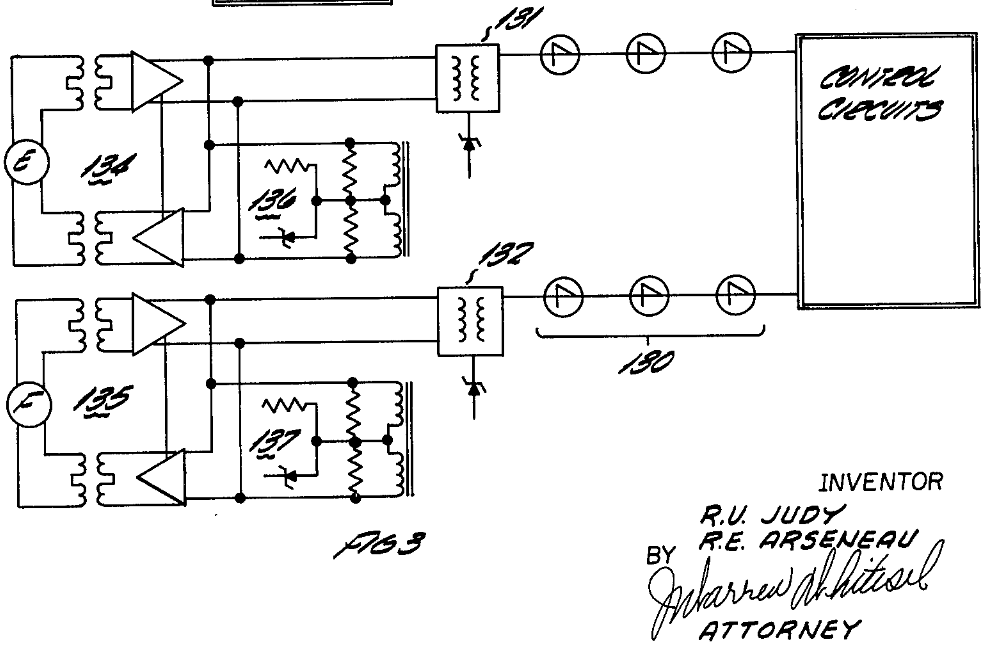
FIGURE 3 is a simplified showing of a two-wire electronic switching system for interconnecting four-wire subscriber line.

An electronic switching telephone system is shown in FIG. 3 to illustrate how a two-wire system may be converted into a four-wire system through the use of this invention. The two-wire system comprises a PNPN diode switching network 130 for extending connections between a two-wire calling point of access 131 and a two-wire called point of access 132. A number of four-wire lines E, F are shown on the left side of the figure. Interposed between the four-wire lines and the two-wire points of access are amplifier modules 134, 135 which adapt the four-wires to two-wire switching. The link circuits 136, 137 mix the transmit and receive signals. These are also identical to the module 105 and the link 110 of FIG. 1. To utilize this circuit for conference call purposes, it is only necessary to extend a plurality of switch paths through the network 130 to a single link which may be connected in lieu of a subscriber line.

The principles of the electronic switching system are described in a co-pending application entitled "Electronic Switching Telephone System," Serial No. 181,626, filed March 22, 1962, by R. E. Arseneau, John Bereznak, and P. E. Osborn and assigned to the assignee of this invention.

*Detailed description*

Two exemplary switching systems are shown in detail to explain how the invention may be used. Other switching systems capable of using the invention will readily occur to those skilled in the art.

*Two-wire switching*

A first of the detailed system drawings (FIGS. 4 and 5) includes incoming and outgoing four-wire circuits 400, 500 joined by a two-wire switchboard 401. Each of the four-wire circuits terminates in an amplifier module 402, 502 which convert the four-wires to two-wire operation. The switchboard 401 includes a cord circuit 404 having an answer plug 405 and a call plug 506 connected to a link 407 which mixes voice signals while isolating the four-wire circuit from oscillatory conditions.

Figure 4:
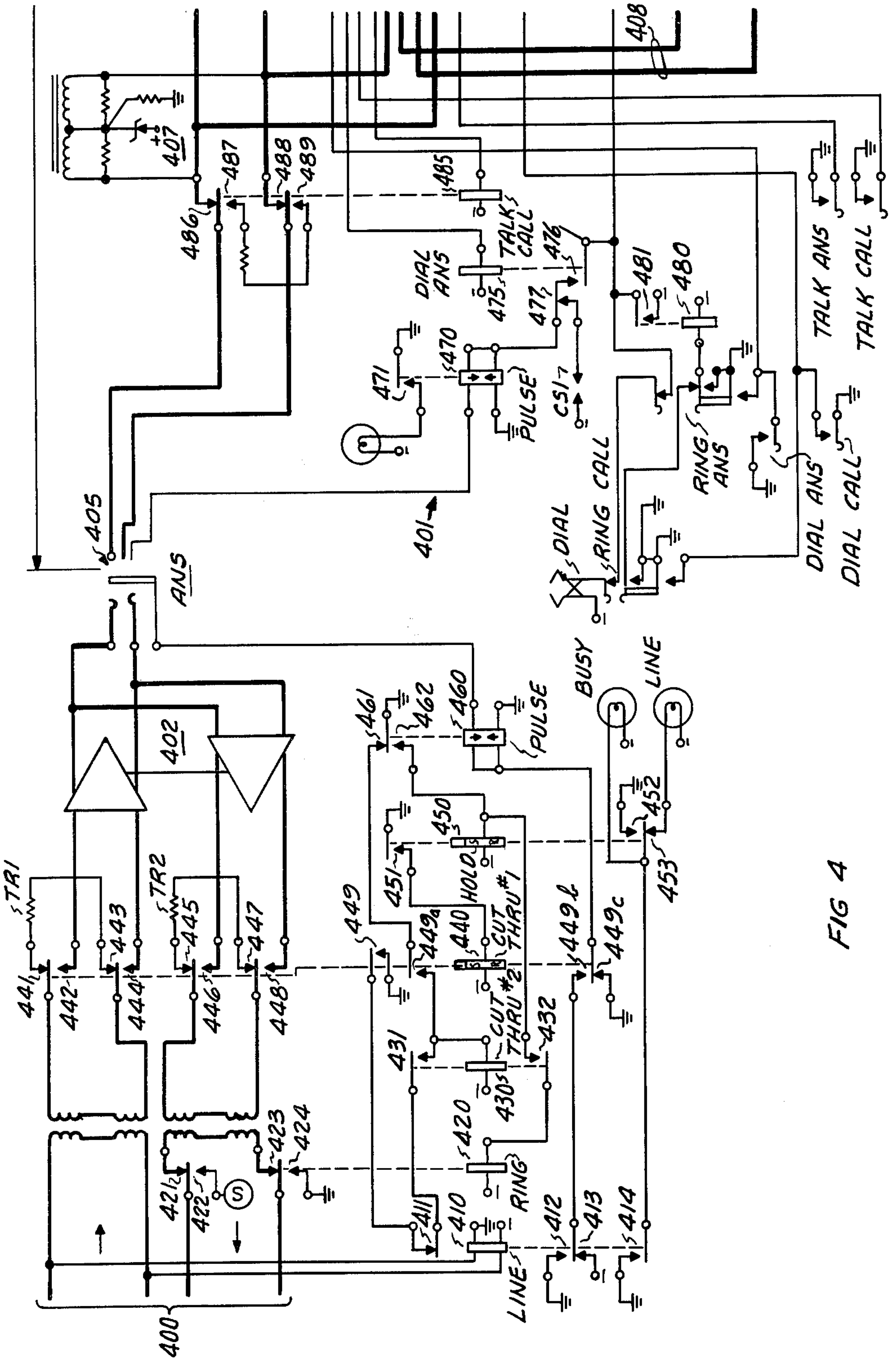
FIGURES 4 and 5 are schematic circuit diagrams showing how conventional two-wire manual switchboards may be adapted to switch four-wire circuits.
Figures 5, 6:
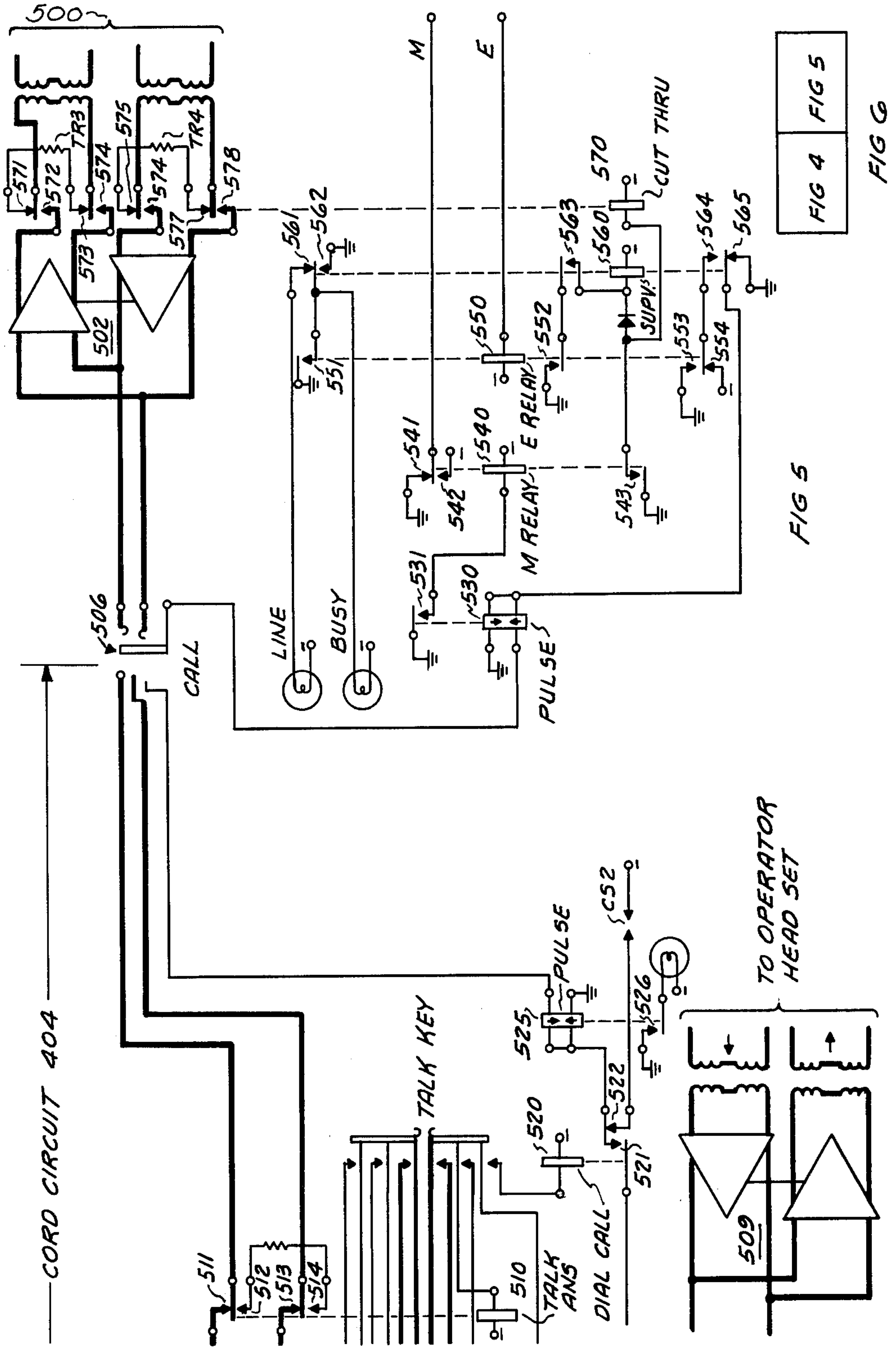
FIGURE 6 shows how FIGURES 4 and 5 should be joined to provide a complete and understandable circuit.

Next a call will be described as it progresses through the circuit from FIGS. 4 to 5.

*Seizure.*—To extend a call to the switchboard 401, any suitable equipment (not shown) connected to four-wire circuit 400 closes a loop across the winding of line relay 410. Contacts 414 close to light a BUSY lamp and a LINE lamp over a circuit including contacts 453.

The operator observes the lamp and completes a plug-and-jack connection at 405. When the plug is removed from its seat, cord seat contacts CS1 close and relay 470 operates over its lower winding and contacts 477. When the plug-and-jack connection is completed at 405 a circuit is extended from battery through contacts CS1, 477, the upper winding of relay 470, the sleeve of plug-and-jack 405, the upper winding of relay 460, and contacts 449c to ground. Relay 470 is differentially energized and released. Relay 460 operates.

When relay 460 closes contacts 462, hold relay 450 operates. This, in turn, opens contacts 453 to extinguish the LINE lamp. The BUSY lamp remains lit over contacts 452. The contacts 451 close to operate "cut thru #1" relay 440.

Responsive to the operation of relay 440, contacts 449b, 449c transfer the holding circuit for relay 460 to ground at contacts 412. Contacts 441–448 operate to couple the amplifier module 402 to line 400 in lieu of the termination resistors TR1, TR2.

Next, the operator moves the TALK KEY to complete a talking circuit from plug 405 through contacts 486, 488 and operated TALK KEY contacts, conductors 408, and amplifier module 509 to the OPERATOR HEAD SET.

*Called line.*—The operator talks to the calling party and learns the destination of the call. When the CALL plug is removed from its seat, cord seat contacts CS2 close and relay 525 operates over its lower winding via contacts 522. When the plug-and-jack are connected at 506, relay 530 operates over a circuit traced from ground at contacts 565, though the lower winding of relay 530, plug-and-jack 506, the upper winding of relay 525, contacts 522, and CS2 to battery. Relay 525 is differentially energized and released.

Upon operation of relay 530, contacts 531 close to operate M relay 540. Then, contacts 541 open and contacts 542 close. This changes the potential on the M lead from ground to battery to signal a distant office. Contacts 543 close to operate relays 560, 570.

The operation of relay 560 closes contacts 562 to light a BUSY lamp. Also contacts 564 close to complete a circuit, for holding relay 530, traced from ground through the relay 530 upper winding, contacts 564, 554 to battery. This same battery shunts the upper winding of relay 525, the circuit extending through the lower winding of relay 530, the plug-and-jack 506, the upper winding of relay 525, contacts 522, CS2 to battery. Relay 525 is no longer differentially energized and operates over its lower winding. Contacts 526 close and a supervisory lamp goes "on."

Relay 570 actuates contacts 571–578 to remove transformer terminations TR3, TR4 and connect amplifier module 502 to line 500.

As those familiar with E and M lead signaling know, the distant office responds to battery on the M lead by applying ground to the E lead. This pulls relay 550 to operate contacts 553 and thus apply a ground to differentially energize relay 525 which releases contacts 526, and a supervisory lamp goes out.

The operator proceeds to take any appropriate action to complete a call. For example, she could talk to a person in a distant office via the circuit extending from her HEAD SET through the amplifier modules 509, the conductors 408, the operated TALK KEY, contacts 511, 513, the plug-and-jack 506, amplifier module 502 and four-wire line 500. She could also operate the DIAL CALL key and her DIAL to send dial pulses over the M lead. If it is necessary to split the connection, a simultaneous operation of the TALK ANSWER key and the TALK KEY causes relay 510 to actuate contacts 511–514 for terminating line 500, thus allowing the operator to talk out over line 400 only. In like manner, a simultaneous operation of the TALK CALL key and the TALK KEY allows the operator to talk over four-wire line 500 only.

Those skilled in the art will readily perceive how calls are extended in a reverse direction. The operator receives a seizure or a call indicating signal when a distant office applies ground to the E lead. She answers, learns that the call is to be completed over four-wire circuit 400, and makes suitable plug-and-jack connections. Thereafter, she operates either of the RING CALL or the RING ANSWER keys (depending upon which of the two plugs she used to reach line 400). This pulls the ring relay 420 to operate contacts 422, 424 for ring down signaling over four-wire line 400. She may also operate her DIAL and DIAL ANSWER key or DIAL CALL key to set automatic switches connected to line 400.

The point is that this use of the amplifier modules 402, 502, 509 and link 407 has converted a conventional two-wire switchboard 401 to switch four-wire circuits 400, 500. This eliminates the need for expensive special built, four-wire components. It also eliminates the hybrid losses of previous systems.

*Four-wire conference call circuit (FIGS. 7–9)*

The principles of the second exemplary system (FIGS. 7–9) are explained by the block diagram of FIG. 2 which shows a cordless switchboard.

This diagram includes a number of four-wire subscriber lines C, D and switching modules 120, 121. Normally one pair of these four-wire lines is a transmit channel T1 and the other pair is a receive channel R1. Each switching module (120, for example) includes a stepping switch, its control relays, and six wipers with banks. Here the banks, shown collectively at B1, B2, of all switches are multiplied as shown at M1, M2, M3, M4. Therefore, to interconnect two or more lines, it is only necessary to operate the switches associated with those two or more lines to seize the same common multiple. For example, a subscriber at station C may talk to a subscriber at station D over the circuit extending from subscriber station C through amplifier module 124, switch 120, bank B1, multiple M1, bank B2, switch 121, and amplifier module 125 to subscriber station D.

In addition to the four-wire multiples M1, M3, there are also two-wire multiples M2, M4 with attached circuitry, such as link 123, for providing conference call facilities. Thus, to complete a conference call, it is only necessary for a plurality of switches, such as 120, 121 to seize the multiple M2.

Some multiples, such as M1, M2, in each of the switches 120, 121 appear at a first operator position and other multiples, such as M3, M4, appear at a second operator position. This way either operator may control all switches to establish a call.

Figure 7:
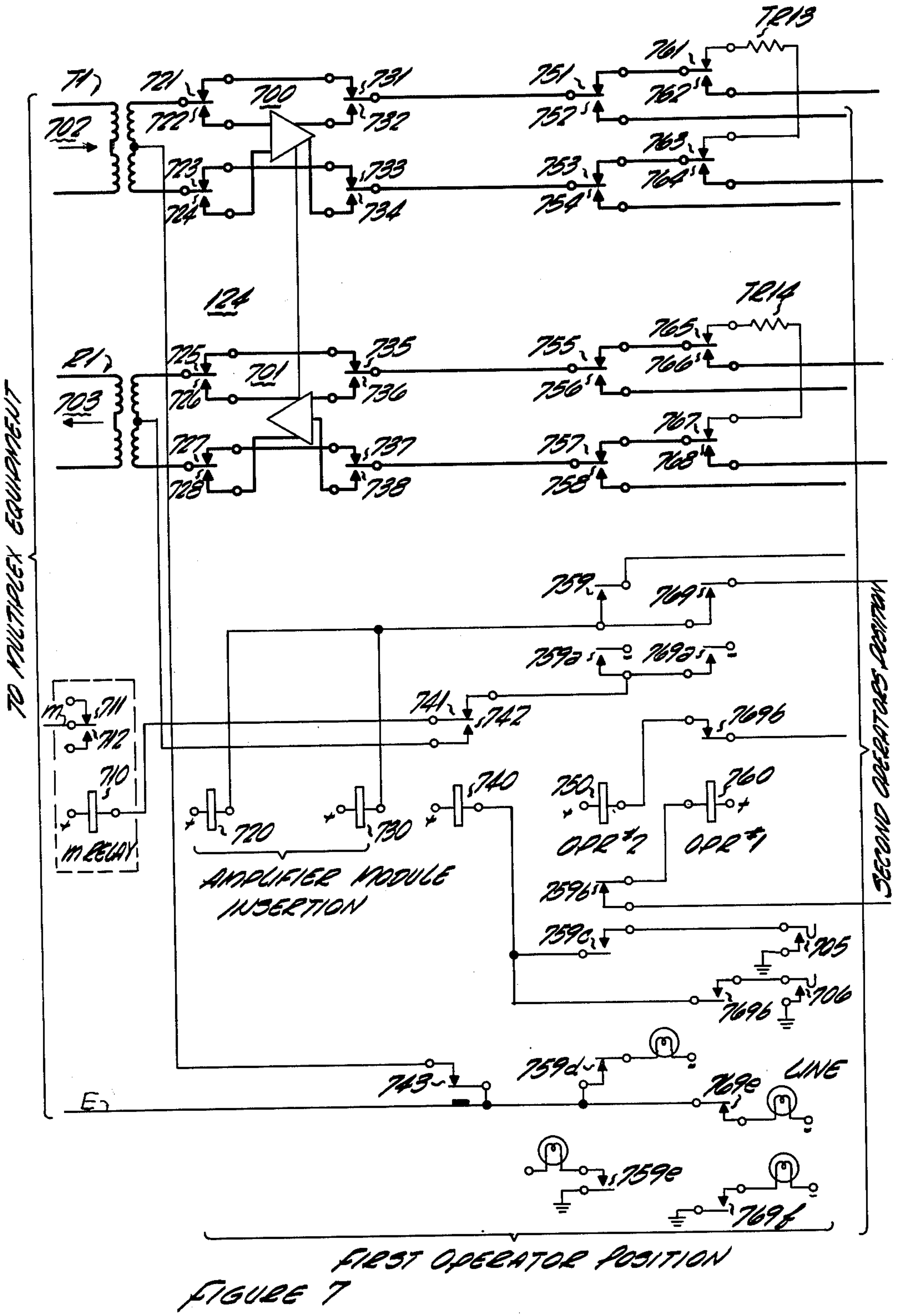
FIGURES 7, 8 and 9 are schematic circuit diagrams showing how the invention is used in the conference call circuit of FIGURE 2.
Figure 8:
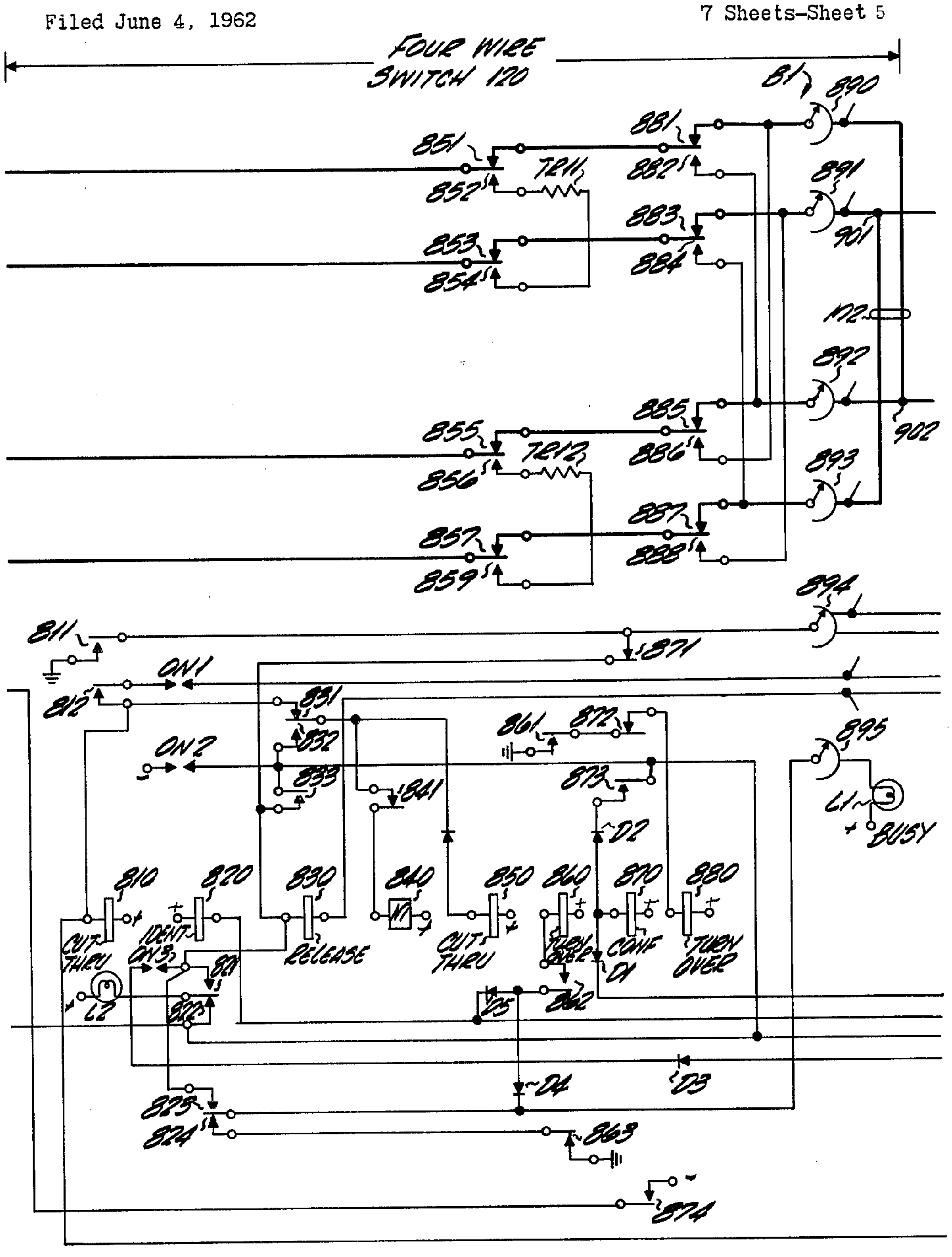
Figure 10:
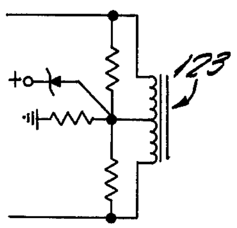
FIGURE 10 shows how FIGURES 7, 8 and 9 should be joined to provide a complete and understandable circuit.
Figure 10:
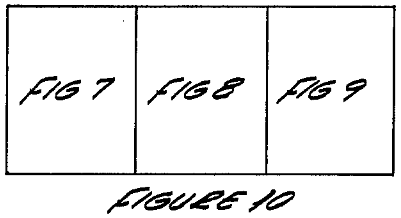
Figure 9:
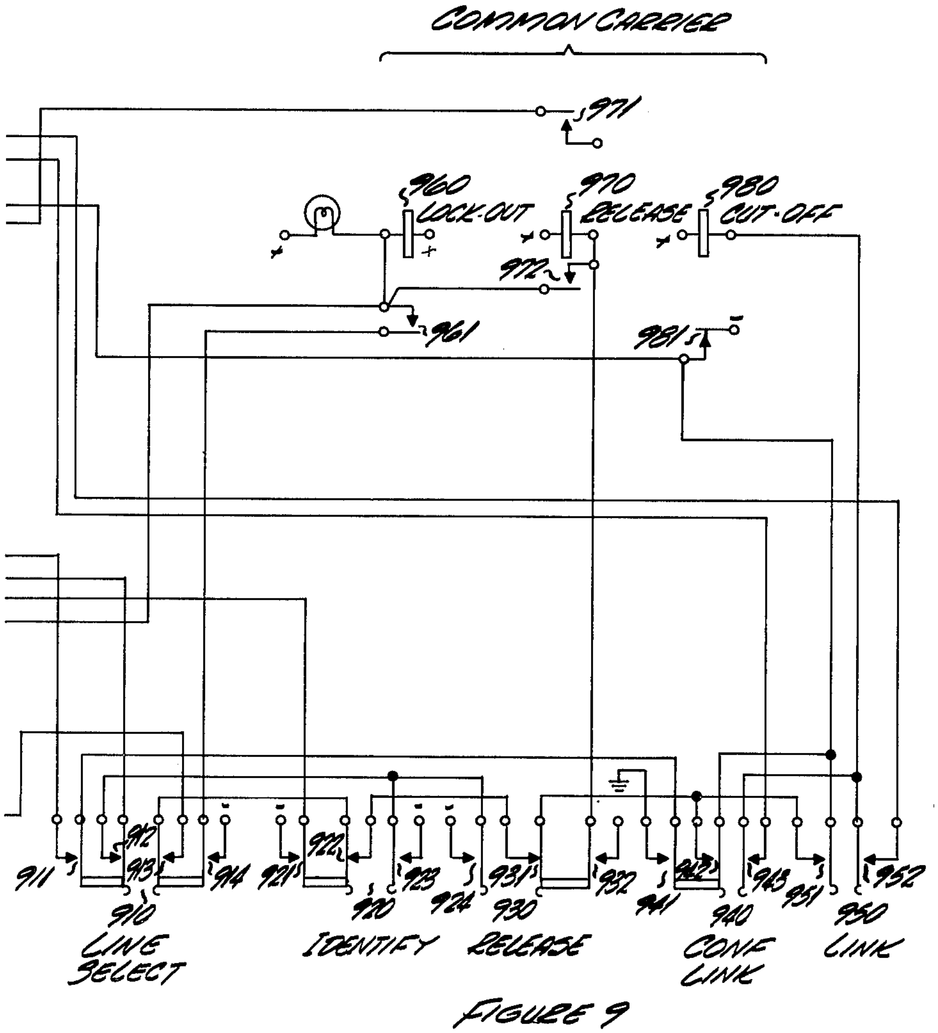

The details of the circuitry required by the hollow blocks of FIG. 2 are shown in FIGS. 7–9. More particularly, the amplifier modules and the circuit for transferring between the first and second operator positions are shown in FIG. 7. The four-wire switch and associated circuit 120 is shown in FIG. 8. The common control circuit used by an operator to control the switch is shown in FIG. 9. Various keys, lamps, and the like, are scattered through these figures at convenient locations; however, as will be apparent to those skilled in the art, the keys and lamps are physically located at a control panel.

Since most of the circuit is described in the above identified Miller-Duncan co-pending application, only a conference call will be described here. For this description, it is assumed that the operator already knows that a conference call is desired.

*Calling condition.*—When a calling subscriber goes off-hook a circuit is completed over a transmit channel 702 through a transformer to contacts 721, 723. A LINE lamp lights via the E lead and contacts **769*e*. Responsive thereto, an operator pushes an associated line select key 910 and a conference link key 940**.

The closure of contacts 913, 942 operates cut-thru relay 810 over the circuit traced from (+) battery through the winding of relay 810, keys 913, 922, 931, 942, and contacts 981 to (−) battery. Relay 850 operates in parallel with relay 810 via contacts 831.

A conference relay 870 operates over a path traced from (+) battery through diode D1, contacts 911, 941 to ground. Contacts 871 open to disable the release relay 830 so that one conferenced line will not be released while another is being added to the conference call circuit. Contacts 872 open to prevent the reverse of transmit and receive channels which normally occurs on a called line. During non-conference calls, relay 880 operates contacts 881–888 to cause such channel reverse. The conference relay 870 locks operated to (−) battery via diode D2, contacts 873 and off-normal contacts ON2, the operation of which is described below. Finally, contacts 874 close to prepare for insertion of the amplifier modules 700, 701.

It might be noted that the operator selected the conference link key 940 because the associated busy link lamp L1 is dark. When key 940 is operated, a circuit is completed from (+) battery through the winding of relay 980, key 943, and the bank terminal of switch 894 individually associated with the selected conference link.

The motor magnet 840 operates over the circuit traced from (+) battery through the magnet winding, interrupter contacts 841, contacts 831, keys 913, 922, 931, 942 and contacts 981 to (−) battery. Interrupter contacts 841 open to release magnet 840; brushes 890–895 advance one step. Each of the off-normal contacts (ON) of FIG. 8 operates. If brush 894 does not find (+) battery, magnet 840 reoperates when interrupter contacts 841 close. The brushes advance a second step. Stepping continues until brush 894 finds (+) battery.

Lamp L2 lights via contacts 822 and ON2 to identify the operating switch to the operator. Operator #1 relay 760 operates through contacts **759*b* and off-normal contacts ON2. Then contacts 769*a* close to operate the M relay 710 via contacts 741. This causes transmission of M conductor supervisory signals at contacts 711, 712. The line key contacts 913 close a circuit to kick the switch of FIG. 8 off its home position. The off-normal contacts ON1 close an alternate stepping circuit so that the line key 910 may be released at once, and the switch will continue to step from the (−) battery at contacts 981**.

To stop the stepping switch on the bank terminal marked by the conference link key 940, cut-off relay 980 operates over a circuit from (+) battery through the relay 980 winding, key 943, bank and brush 894, and contacts 811 to ground. Relay 980 opens contacts 981, removes the motor magnet 840 drive source, and releases relay 810. Switch motion terminates and link busy lamp L1 lights over the bank 895, and contacts 824, 863 to ground. This shows that the link is busy. Diodes D4 and D5 do not conduct lamp battery current.

The talking circuit has been completed from line 702 over the heavily inked conductors to a pair of terminals 901, 902 of the link 123. More particularly, when the operator #1 relay 760 operated, contacts 769 closed to complete a circuit from (−) battery at contacts 874 through the windings of amplifier module insertion relays 720, 730 to (+) battery. This inserted the amplifier module 700 into the talking circuit via contacts 722, 724, 732, 734. The operator #1 relay 760 closed contacts 762, 764. The switch brushes 890, 891 also extended the talking circuit to points 901, 902. When the cut-off relay 980 operated contacts 981, the cut-thru relay 850 released to complete the talking circuit at contacts 851, 853.

In like manner, the receive channel 703 talking circuit is completed over the heavily linked conductors to points 901, 902. For our purposes, it may be assumed that the points 901, 902 are the multiple M2 of FIG. 2.

The operator connects the subscriber D (FIG. 2) to the same conference link by operating the four-wire switch 121 to seize the conference link 123 via multiple M2. In like manner, any number of conferenced subscribers may be connected to multiple M2.

Those portions of FIGS. 7–9 not described herein will be apparent from a study of the aforementioned Miller-Duncan co-pending application.

The point here is first that conventional switching equipment is adapted to connect up to twenty-five lines in a conference call, and second that conventional four-wire switch gear may operate into a two-wire line. Further, many more than twenty-five lines may be conferenced if a slight loss of signal quality can be tolerated.

*Amplifier module and link (FIG. 11)*

FIG. 11 shows the details of the amplifying module and the link included in the previous drawings, as at 105, 110 (FIG. 1) for example. The principal parts of FIG. 11 are: A transmit amplifier 1100, transformer coupled at 1101 to an incoming two-wire channel 1102; a receive amplifier 1103, transformer coupled at 1104 to an outgoing two-wire channel 1105; a link circuit 1106 for mixing the four-wire signals while isolating the four-wire circuit 1102, 1105 against oscillatory conditions; and a crossover signal canceling amplifier 1108 interposed between the amplifiers 1100, 1103 to control the circuit gain and prevent oscillation causing feedback. All amplifiers are biased for class A, push-pull operation. Class A operation means that the amplifier is biased at its base with respect to its alternating base voltage such that collector current flows at all times.

The transmit amplifier 1100 includes a pair of semiconductor devices Q1, Q2 (here shown as junction type PNP transistors in common emitter configuration). A voltage divider 1112 connected between a (+) 28 v. battery and ground provides these transistors with a base bias potential, the circuit extending via windings W1, W2 of the coupling transformer 1101. A decoupling capacitor 1113 coupled across the voltage divider 1112 prevents any change of base bias as a function of an A.C. signal. The emitters are energized from the (+) 28 v. battery via resistors 1114, 1115, 1116. A resistor 1117 terminates the secondary winding of the transformer 1101 to match the impedance of the two-wire pair 1102. There is no collector load resistance—that is provided by the link circuit 1106. Instead, the output of the transmit amplifier connects directly to a pair of terminals 1118, 1119. The impedance across these terminals, looking toward the amplifier 1100 is very high. The impedance looking toward the link 1106 is very low. This way many transmit amplifiers may be connected in parallel to the link without causing any substantial unbalance or phase shift.

The receive amplifier 1103 includes an impedance matching input circuit 1120, an amplifier 1121, and the output transformer 1104. The impedance matching circuit includes a pair of semiconductor devices Q3, Q4, here shown as PNP junction type transistors connected in common collector or emitter follower configuration. This configuration is selected because it presents the highest input impedance. Again, this high impedance is desirable so that many receive amplifiers may be connected in parallel to the link without causing mismatch or phase shift. The transistors Q3, Q4 have a common collector resistor 1125 connected to ground, and an emitter load circuit including a pair of resistors 1126, 1127 connected to a (+) 28 v. battery. There is no base bias—that is supplied from the link 1106.

The output amplifier 1121 also has a pair of semiconductor devices Q5, Q6 (shown as PNP junction type transistors connected in common emitter configuration). The base electrodes are direct coupled to the emitters of transistors Q3, Q4, and the emitters are coupled to a (+) 28 v. battery via resistors 1130, 1131, 1132. The collector load circuits include resistors 1134, 1135 and windings W3, W4 of the output transformer 1104. The resistors 1134, 1135 also match the transformer 1104 impedance to the impedance of line 1105.

Link means are provided for mixing voice signals while isolating the four-wire circuit against electrical disturbances which might otherwise cause singing. More particularly, this link means is a two terminal device 1106 including a voltage divider for providing the collector potential for transistors Q1, Q2 and the base bias for transistors Q3, Q4. The voltage divider extends from ground through resistor 1140 and zener diode 1141 to a (+) 28 v. battery. The zener diode acts as a power regulating device. A pair of resistors 1142, 1143 act as A.C. load circuits for transistors Q1, Q2. A divided choke coil 1144 presents an extremely low impedance to D.C. biasing potentials and an extremely high A.C. impedance. This keeps the D.C. bias from changing as a function of the A.C. signal. It also prevents any A.C. signal phase shift. The object is to couple the output of transistors Q1, Q2 to the input of transistors Q3, Q4 with no phase shift despite the fact that the associated switch train may connect any number up to twenty-five (or more) transmit and receive amplifiers to terminals 1118, 1119.

Means are provided for coupling together the transmit and receive amplifiers to control the volume thereof during periods when the four-wire system might otherwise break into oscillation. More particularly, this coupling means comprises a pair of semiconductor devices Q7, Q8, here shown as PNP junction type transistors. The base bias is applied from the voltage divider 1112 through windings W1, W2 and the emitter potential via resistors 1150–1152. The collector loads are the windings W3, W4 and the resistors 1134, 1135. The resistors 1151, 1152 are preferably adjusted so that the gain of transistors Q7, Q8 exactly equals the gain of transistors Q5, Q6. There is a phase shift of 180° between the output of transistors Q5, Q6 and Q7, Q8. Thus, any A.C. signals appearing in channel 1102 cause exactly equal and opposite signals which cancel the output of transistors Q5, Q6. This means that amplified signals do not feed back for re-amplification to cause singing.

It may be noted that the signal cancellation is within four-wire circuits connected to a single subscriber line. There is no cancellation between adjacent or parallel connected four-wire circuits. Thus, subscribers may talk to each other, but may not hear themselves. Usually the telephone subset provides side tone. If it does not, and further if subscribers object to a "dead" phone, the resistances 1151, 1152 may be adjusted so that the channel 1102 signals do not quite cancel in the receive amplifier. However, care must be taken to be sure that the non-cancelled feedback signal does not exceed the volume that causes oscillation.

A particular advantage of this circuit is that the impedance across points 1118, 1119 is fixed by the output impedance of transistors Q1, Q2. Thus, every line connected to the link 1106 presents the same fixed impedance. This avoids unbalances caused by the differences in the impedances of lines 1102 and the like. Hence, the usual hybrid problem of balancing a line loop is not encountered. Moreover, elimination of the hybrid loss at the transformer coupling means that the entire signal is available to drive the transmit amplifier 1100. This means an over all improvement in the signal quality. Thus, the over all cost of the system may be reduced—as by lengthening line loops for example. Finally, all of these advantages result from the use of general purpose modules which find many applications.

While the principles of the invention have been described above in connection with specific apparatus and applications, it is to be understood that this description is made only by way of example and not as a limitation on the scope of the invention.

We claim:

1. In a two-wire switching device for a four-wire communication system wherein a first two of said four-wires comprise a transmit channel and the other two of said four-wires comprise a receive channel, the combination therewith comprising first and second amplifiers each having input and output terminals, means for coupling said transmit channel to the input of said first amplifier and the receive channel to the output of said second amplifier, means for coupling together said first and second amplifiers to reduce the volume of said second amplifier during conditions when the four-wire system might otherwise break into oscillation, two-wire link means for mixing the signals feeding through the two amplifiers and for isolating said amplifiers from electrical effects which might cause singing, and two-wire switching means including said link for connecting to the output of said first amplifier and the input of said second amplifier.

2. The device of claim 1 wherein said link means comprises a voltage divider including a power regulating device connected to an alternating current load circuit and a direct current biasing circuit.

3. The system of claim 1 wherein said link comprises a parallel circuit including a choke coil and a series of resistances connected acros said two-wires, and a voltage divider comprising a resistor and zener diode connected in series across a source battery potential, the junction between said resistor and diode being connected to the midpoints of said choke coil and series of resistors.

4. A two-wire switching system for a four-wire communication circuit, a first two of said four-wires comprising a transmit channel and the other two of said four-wires comprising a receive channel, three class A push-pull amplifiers each having input and output electrodes, means for coupling said transmit channel to the input electrodes of a first of said amplifiers and the receive channel to the output electrodes of a second of said amplifiers, means for coupling together the input electrodes of the first and third of said amplifiers, means for coupling together the output electrodes of the second and third of said amplifiers, two-wire link means for providing an alternating current load and direct current bias for the output electrodes of said first amplifier and direct current bias for the input electrodes of said second amplifier, and two-wire switching means interposed between the output electrodes of said first amplifier, the input electrodes of said second amplifier and said link means.

5. A telephone system comprising four-wire switching means for extending a plurality of four-wire lines to a conference call circuit, means in said conference call circuit comprising a pair of oppositely poled amplifiers associated with each of said lines for connecting said four-wire lines to two-wire terminals, a first of said amplifiers having a relatively high output impedance, the second of said amplifiers having a relatively high input impedance, low input impedance means coupled to said two-wire terminals for linking said first amplifier output to said second amplifier input, and means interconnecting said amplifiers to control the volume of said second amplifier as a function of signals in said first amplifier.

6. The system of claim 4 wherein said means coupled to said two-wire terminals comprises a parallel circuit including a choke coil and a series of resistances connected across said terminals, and a voltage divider comprising a resistor and zener diode connected in series between a source of potential and ground, the junction between said resistor and diode being connected to the midpoints of said choke coil and series of resistors.

7. A two- to four-wire converter module having general utility comprising first, second, and third class A push-pull amplifiers each having input and output terminals, the output terminals of said first amplifier and the input terminals of said second amplifier having relatively high impedance, means for coupling together the input terminals of said first and third amplifiers and the output terminals of said third and second amplifiers, there being a 180° phase shift between the output of said second and third amplifiers to control the volume of said second amplifier during conditions when the four-wire system might otherwise break into oscillation, and two-wire low impedance link means for applying signals from the output of said first amplifier to the input of said second amplifier and for isolating said amplifiers from electrical effects which might cause singing.

8. The module of claim 7 and means for connecting conventional two-wire switching means between said amplifiers and said link means.

9. The module of claim 7 and means for connecting conventional four-wire switching means between said amplifiers and said link means.

10. The system of claim 7 wherein said link comprises a parallel circuit including a choke coil and a series of resistances connected across said two-wires, and a voltage divider comprising a resistor and zener diode connected in series between a source of potential and ground, the junction between said resistor and diode being connected to the midpoints of said choke coil and series of resistors.

11. An electronic system for connecting a two-wire switching system into a four-wire transmission circuit comprising an electronic switching network for extending switch paths between a calling two-wire access point and a called two-wire access point, a plurality of four-wire lines, means comprising a module of general utility interposed between each of said four-wire lines and a corresponding one of said two-wire access points, said module comprising a transmit amplifier and a receive amplifier with an automatic gain control interposed therebetween, said gain control reducing the gain of said receive amplifier when signals are present in said transmit amplifier, and means comprising a link circuit for applying signals from said transmit amplifier to said receive amplifier while isolating said amplifiers from oscillatory causing conditions.

12. The system of claim 11 and means including said switching network for extending a plurality of switch paths to a common link.

13. A two-wire switching system for a four-wire communication network comprising a plurality of four-wire communication channels, a first two of each of said four-wires comprise a transmit channel and the other two of each of said four-wires comprise a receive channel, an amplifying device terminating each of said communication channels, each of said amplifying devices comprising first, second, and third class A push-pull amplifiers each having input and output terminals, means for coupling said transmit channel to the inputs of said first and third amplifiers and the receive channel to the outputs of said second and third amplifiers, means for shifting the phase of the outputs of said second and third amplifiers by 180° with respect to each other, a plurality of two-wire link means common to said four-wire channels for mixing the signals feeding through the amplifier devices, and two-wire switching means for selectively interconnecting at least two of the amplifier devices and one of said link means, thereby completing a two-wire connection between the four-wire communication channels associated with said selected devices.

14. The system of claim 13 and means including said switching means for selectively connecting more than three of said four-wire communication channels to one of said link means, thereby completing a conference call.

15. The system of claim 13 wherein each of said link means comprises a parallel circuit including a choke coil and a series of resistances connected across said two-wires, and a voltage divider comprising a resistor and zener diode connected in series across a source of potential, the junction between said resistor and diode being connected to the midpoints of said choke coil and series of resistors.

16. An electronic system for connecting a two-wire switching system into a four-wire transmission circuit comprising an electronic switching network for extending switch paths between a calling two-wire access point and a called two-wire access point, a plurality of four-wire lines, means comprising a module of general utility interposed between each of said four-wire lines and a corresponding one of said two-wire access points, said module comprising a transmit amplifier and a receive amplifier with an automatic gain control interposed therebetween, said gain control reducing the gain of said receive amplifier when signals are present in said transmit amplifier, means comprising a link circuit for applying signals from said transmit amplifier to said receive amplifier while isolating said amplifiers from oscillatory causing conditions and said link circuit means comprising a parallel circuit including a choke coil and a series of resistances connected across a pair of terminals, and a voltage divider comprising a resistor and zener diode connected in series across a source battery potential, the junction between said resistor and diode being connected to the midpoints of said choke coil and series of resistors.

References Cited by the Examiner

UNITED STATES PATENTS

| | | | |
|---|---|---|---|
| 2,084,457 | 6/1937 | Schott | 179—170.6 |
| 2,273,945 | 2/1942 | Fisher | 179—170.6 |
| 2,304,220 | 12/1942 | Waller | 179—27 |

ROBERT H. ROSE, *Primary Examiner.*

WALTER L. LYNDE, *Examiner.*